United States Patent [19]

Auinger

[11] Patent Number: 4,890,049
[45] Date of Patent: Dec. 26, 1989

[54] CIRCUIT AND WINDING ARRANGEMENT FOR A MULTIPHASE ELECTRIC ROTATING FIELD MACHINE

[75] Inventor: Herbert Auinger, Nuremberg, Fed. Rep. of Germany

[73] Assignee: Siemens Aktiengesellschaft, Berlin and Munich, Fed. Rep. of Germany

[21] Appl. No.: 218,703

[22] Filed: Jul. 13, 1988

[30] Foreign Application Priority Data

Jul. 23, 1987 [DE] Fed. Rep. of Germany ....... 3724441
Apr. 27, 1988 [DE] Fed. Rep. of Germany ....... 3814244

[51] Int. Cl.$^4$ .............................................. H02P 1/32
[52] U.S. Cl. ..................................... 318/771; 310/71; 310/184
[58] Field of Search ........ 310/180, 184, 198, 200–208, 310/71, 72, 211, 216, 68 R, 166; 318/778, 780, 771, 814

[56] References Cited

U.S. PATENT DOCUMENTS

| 1,849,519 | 3/1932 | Gay . | |
| 1,927,208 | 9/1933 | Gay | 318/771 |
| 2,217,460 | 10/1940 | Trassl | 310/771 |
| 4,338,557 | 7/1982 | Vanlass | 318/814 |

FOREIGN PATENT DOCUMENTS

| 0110474 | 4/1928 | Austria | 318/771 |
| 695698 | 8/1940 | Fed. Rep. of Germany . | |
| 7522481 | 2/1943 | Fed. Rep. of Germany . | |
| 1265852 | 4/1980 | Fed. Rep. of Germany . | |
| 3202958 | 11/1983 | Fed. Rep. of Germany . | |
| 499432 | 2/1920 | France . | |
| 0621623 | 5/1927 | France | 318/771 |
| 968345 | 6/1948 | France . | |
| 2191323 | 1/1974 | France . | |
| 0005516 | 1/1979 | Japan | 318/771 |

OTHER PUBLICATIONS

Patent Abstracts of Japan, vol. 4, No. 170, Nov. 22, 1980, Appln. No. 55 117 491.
Conti Electro Berichte; Schaltung von Induktionsmotoren Für Mehrstufige Stern–Dreieck Einschaltung; H. O. Seinisch; pp. 212–215; 10–12/1965.
Induktionsmachinen; W. Schuisky; p. 284; 1957; Vienna; Springer Verlag.
Die Wicklungen Electrischer Maschinen; H. Sequenz; vol. 3; Wechselstrom–Sonderwicklungen; Vienna; Springer Verlag; 1954.

*Primary Examiner*—R. Skudy
*Attorney, Agent, or Firm*—Kenyon & Kenyon

[57] ABSTRACT

A switchable arrangement for at least three different operating states is made possible with a minimum number of external winding terminals and a switching device as simple as possible, and current heating of the entire winding as uniform as possible. In the starting-up stages with free adaptation of the inrush current reduction and far-reaching avoidance of disturbing field harmonics is provided. The machine impedance is increased over the normal operating stage by the provision that in the normal operating stage the parallel connected winding branches assigned to a leg are separated and are assigned to different branches, remain without current in part in individual stages and/or are operated with partly different direction of excitation.

12 Claims, 5 Drawing Sheets

A 1

A1

A1

A1

A1

A1

A1

A1

A1

B1

A1/B1

A1/B1

CIRCUIT AND WINDING ARRANGEMENT FOR A MULTIPHASE ELECTRIC ROTATING FIELD MACHINE a. BACKGROUND OF THE INVENTION

The invention relates to a circuit and winding arrangement for a multiphase electric rotating-field machine particularly an induction motor having a squirrel cage rotor, for increasing the effective machine impedance and for reducing an inrush current of squirrel cage induction motors.

b. DESCRIPTION OF THE PRIOR ART

In a known two-stage Y-delta starting arrangement for multiphase rotating field electric machine, six external winding terminals (two for each leg) are switched by three 3-pole contactors. This arrangement results in a reduction of the inrush current by a ratio $1:\sqrt{3}$. A torque reduction of approximately 1:3 is also obtained in the Y- operating stage as compared to a switching circuit having a delta connection.

In the publication CONTI ELEKTRO BERICHTE (1965), particularly pages 212 to 215, circuit modifications for multistage Y-delta starting arrangements are known which require nine external terminals and correspondingly more elaborate switching devices. This arrangement also permits intermediate current and torque reduction.

Another arrangement for starting electric machines is the so-called partial-winding starting arrangement, such as is known, for instance, from page 284 of the book by Schuisky, "INDUKTIONSMASCHINEN", Vienna, Springer Verlag (1957) and from pages 359 to 364 of the book by H. Sequenz, "DIE WICKLUNGEN ELEKTRISCHER MASCHINEN", Vol. 3, "WECHSELSTROMSONDERWICKLUNGEN", Vienna, Springer Verlag (1954).

In this starting arrangement, winding branches of each leg, which are connected parallel during normal operation of the motor, are separated during the starting process and are connected only partially to the network, while the remaining section of the windings remain idle. The effective stator impedance is then increased in the ratio of the complete winding to the active winding sections connected to the network. However, a harmonic reactance which depends on the winding distribution, is generally increased substantially and is caused by the pronounced winding harmonic and subharmonic fields due to the partial winding operation.

Two-stage switching arrangements have the advantage of only two three-phase switching contactors which require only six external winding terminals. However this is counterbalanced by the disadvantage that, due to the field harmonics and subharmonics, harmful parasitic torques occur which may in some cases cause stalling of the motor during acceleration. In addition, the dissipation losses in the stator produced during the acceleration phase are concentrated in the winding parts connected to the network. If therefore the motor is frequently turned on and off as is the case, for instance, in repetitive applications, a very uneven and undesirable thermal stress of the individual winding parts in the stator is obtained.

German Pat. No. PS 69 56 98 discloses an arrangement which is switchable in two stages, for a double-Y circuit similar to FIG. 1. In this arrangement the winding branches normally belonging to a leg are separated and are assigned to other legs. U.S. Pat. No. 1,848,519 and the Japanese Application JP-A-55 117 491, disclose, in addition, a comparable arrangement, switchable in two stages, of for a double-delta circuit similar to the embodiment of FIG. 5. In both cases, three connecting elements contact the six winding terminals. Multistage switching according to the first-mentioned patent is also described in German Pat. No. 75 22 48, in which one-half of the winding is divided into additional Y-connected winding branches similar to FIG. 2.

OBJECTIVES AND SUMMARY OF THE INVENTION

It is an object of the invention to provide a circuit and winding arrangement which can be switched in several stages, with a minimum of external winding terminals and as few as possible associated contact points. Another object is to provide a switching device makes it possible to achieve a desired reduction of the inrush current and to avoid interfering harmonics of the torque.

The separation of the winding branches belonging to a particular leg in normal operation and their association to different legs will be designated in the following as feature A1. The operation of the winding branches with partially different direction of excitation will be designated in the following as feature B1. Features A1 and B can be used together.

BRIEF DESCRIPTION OF THE FIGURES

Different examples of the circuit and winding arrangements according to the invention are shown in the drawings.

DETAILED DESCRIPTION OF THE INVENTION

Figure 2:
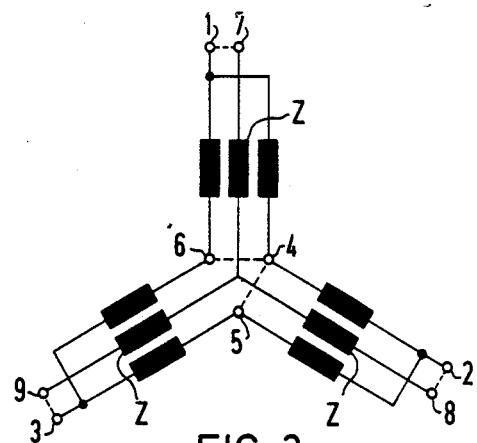
FIG. 2 shows a circuit including feature A1 which can be switched in three stages, with three additional winding branches Z and six external terminals.
Figure 3:
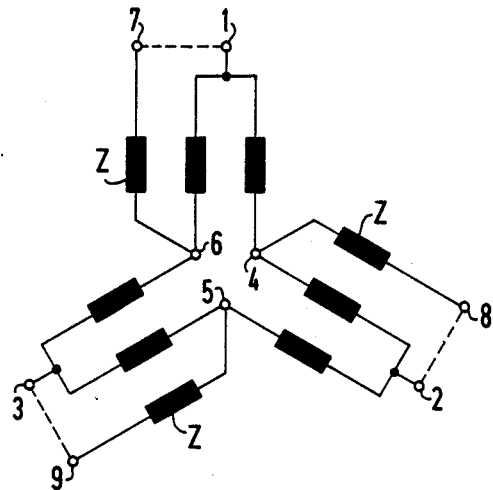
FIGS. 3, 4 show Y- circuits including feature A1 which are modified in accordance with the invention and can be switched in three, four or five stages, with nine external terminals.
Figure 4:
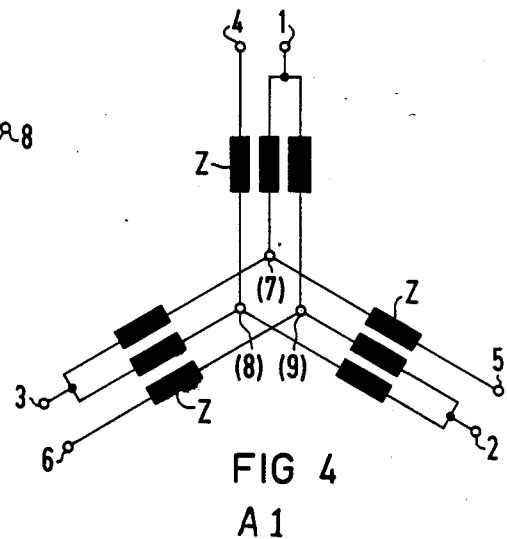
Figure 6:
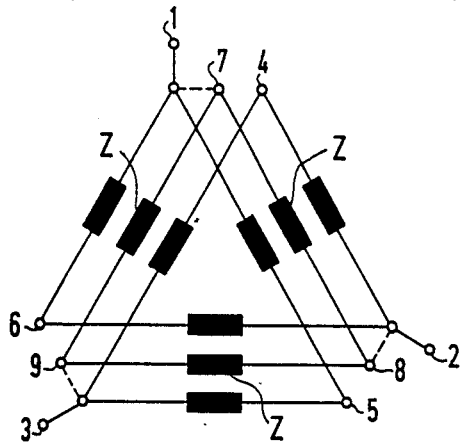
FIG. 6, 7, 8 show modifications of the circuit of FIG. 5 which can be switched in 2, 3 or 4 stages, with six or nine external terminals.
Figure 7:
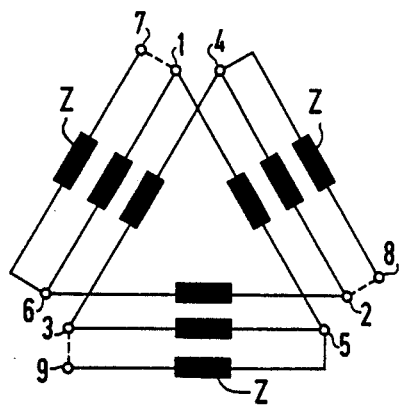
Figure 8:
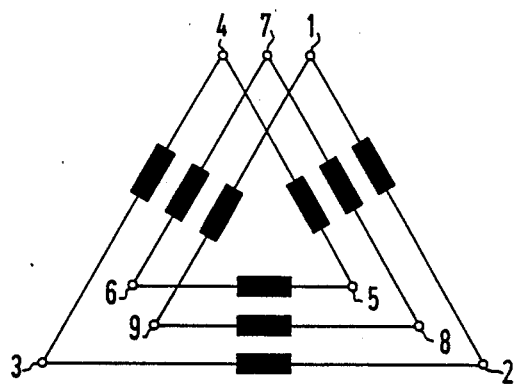
Figure 9:
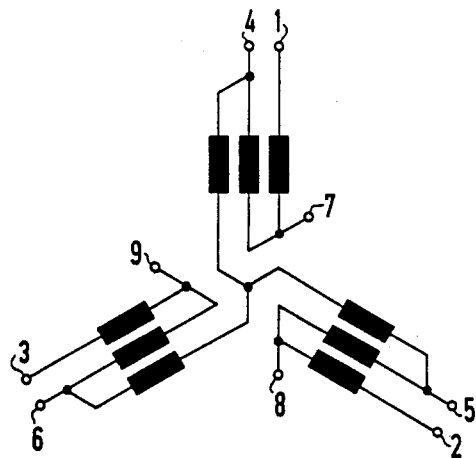
FIG. 9 shows a Y- circuit with feature B1 according to the invention, with nine winding branches and nine external terminals.
Figure 10:
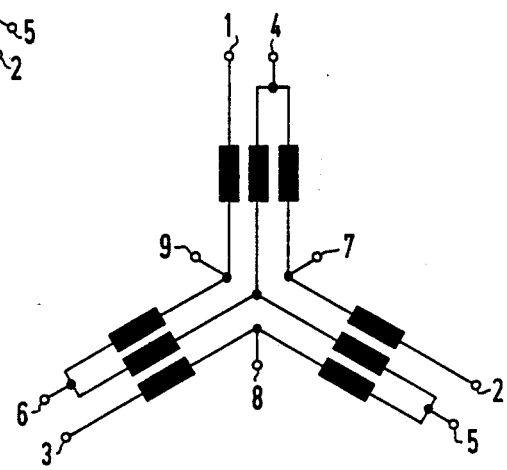
FIG. 10 shows a triply switchable Y circuit with feature B1 with nine winding branches and nine external terminals.
Figure 11:
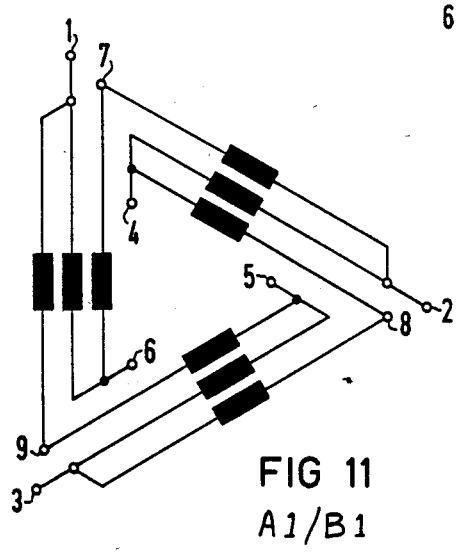
FIG. 11 shows a delta circuit with feature B1 according to the invention which can be switched triply, quadruply or quintuply, with nine winding branches and nine external terminals.

Table I–XII attached hereto contain connection listings for the embodiments of FIGS. 2–11 for multiple stage operations as follows:

| Table I | Shows listings for the circuit according to FIG. 2 |
|---|---|
| Table II | Shows listings for the circuit according to FIG. 6 |
| Table III | Shows listings for the circuit according to FIG. 3 |
| Table IV | Shows listings for the circuit according to FIG. 7 |
| Table V | Shows listings for the circuit according to FIG. 4 |
| Table VI | Shows listings for the circuit according to FIG. 8 |
| Table VII | Shows listings for the circuit according to FIG. 9 |
| Table VIII | Shows listings for the circuit according to FIG. 10 |
| Table IX | Shows listings for the circuit according to FIG. 11 |
| Table X | Shows a subdivision into three parallel winding branches |
| Table XI | Shows a subdivision into two different parallel branches |
| Table XII | Overview of the grouping of the two winding branches for a four-pole winding with four coils per pole and leg. |

In the figures the circuit for the starting stages, with increased effective machine impedance is shown, in which connection is made at the terminals 1, 2 and 3. The circuit connections stage necessary for the normal operating stage, i.e., after the machine has reached normal operating conditions, are indicated in the figures by dashed lines and will be explained in the following in greater detail, referring to the corresponding tables.

Basic Circuit According to Feature A1 and Modifications Thereof

Figure 1:
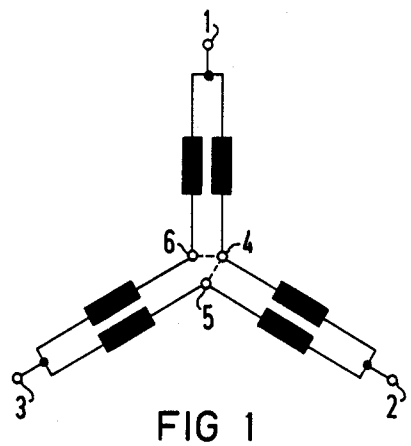
FIG. 1 shows a basic Y- circuit including feature A1 which can be switched in two stages, with six winding branches and six external terminals.
Figure 5:
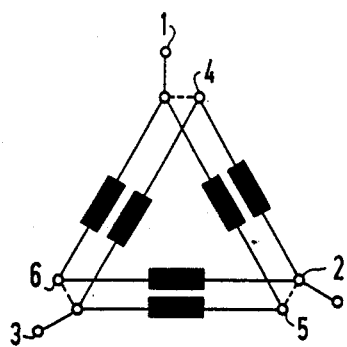
FIG. 5 shows a basic delta circuit with feature A1 which can be switched in two stages, with six winding branches and six external terminals.

In the basic circuits shown in FIGS. 1 and 5 for feature A1, the starting stage is a delta circuit with connections at the terminals 1, 2 and 3. Each leg comprises two series-connected winding branches which form respective parallel branches of different legs in the normal operating stage.

A number of modifications of the basic circuits can be obtained by three additional winding branches Z. Additional winding branches Z can be connected in a fixed manner, for instance, as in FIG. 2 or FIG. 6 in a Y- or delta circuit and parallel to the remaining part of the winding at the terminals 1, 2 or 3. Each winding branch Z is then in operation continuously. The two-stage switching can be accomplished with the same six terminals whereby the basic circuits of FIGS. 1 and 5 is unchanged.

If these additional winding branches Z are made so that they can disconnected as shown in FIGS. 2 and 6, for which purpose three additional terminals 7, 8, 9 are required, four switching stages can be obtained as listed in Tables I and II. Three-stage switching is obtained by omitting one of the switching stages 1., 2. or 3. (See Tables 1 and 2).

If the additional winding is firmly connected (with only six terminals 1–6 and fixed connections of terminals 1–7, 2–8 and 3–9 internal to the machine), only the switching stages 3. and 4. are possible. These connections are framed in bold lines in the tables.

In order to achieve a stepwise decrease of the effective machine impedance, it may be necessary, depending on the respective winding subdivisions present, to optionally interchange the switching stages 1. and 2. given in the tables.

Further circuit embodiments shown in FIGS. 3, 4 and 7 are by the provision that the three additional winding branches Z are not interconnected, i.e., the Z-branches are connected individually at connecting points of the normal windings. The switching stages achievable for these embodiments are listed and explained in the corresponding tables III, IV and V. Again, bold lines indicate the switching stages which can be obtained with only six terminals if, for instance, in FIGS. 3 and 7, the additional winding branches Z are firmly connected by internal switching connections of the terminals 1–7, 2–8, 3–9 or the Y- connection of the additional terminals 7, 8, 9 in FIG. 4 are not external.

Particularly noteworthy are the two modifications shown in FIGS. 3 and 4 to the basic Y- circuit of FIG. 1. Accordingly to Tables III and V, these modifications with nine terminals, allow five switching stages with different effective machine impedance.

In the embodiment according to FIG. 4 of Table V, three circuit states can be achieved with only six terminals. The additional terminals 7, 8 and 9 of the Y-point need not be external. In the normal operating stage, a triple (three-phase) Y-circuit with three distinct separated central points is then used. Importantly in a first operating stage current is fed to terminals 4, 5 and 6 of the additional winding branches Z. The closed winding loop of the rest of the winding operates here only as a Y-point ring connection with impedance. In principle the same situation prevails otherwise also in FIG. 3, Table III, switching stage 1.

In the two modifications shown in FIGS. 7 and 8 of the basic delta circuit (FIG. 5), which according to Tables IV and VI make possible with nine terminals five different switching stages each, the following characteristics should be noted: If in FIG. 7, the main means connection is made to the additional terminals 7, 8 and 9 (Table IV, 1st stage), then the additional winding branches Z are connected in series with the rest of the winding in a delta circuit, partially in opposing directions, and carry 3-times the normal current. In this operating stage, similar impedance-increasing conditions are obtained as in the circuits according to FIGS. 9, 10 and 11 as explained below.

In FIG. 8, the three additional winding branches, not specifically designated, are inserted within the winding branch which is closed in itself in a triple loop with respect to its phase.

The sequence of the individual switching stages given in the table do not necessarily result in a stepwise decrease in the machine impedance. As was already pointed out in connection with Tables I and II, this depends largely on the respectively prevailing winding division. As already mentioned, individual switching stages can also be omitted.

Basic Circuits For to Feature B1 and Modification thereof

A basic Y-circuit according to feature B1 is shown in FIG. 9. The Y-circuit shown in FIG. 10, like the delta circuit in FIG. 11, involves a combination of the two features A1 and B1. By interchanging the terminals with 7, 2 with 8 and 3 with 9 in FIG. 11, another embodiment according to feature B1 alone is obtained. The advantage of the embodiments with combined features A1 and B1 shown in FIGS. 10 and 11 is an additional degree of freedom for the design of the winding and the reduction of m.m.f. harmonics which is created by the changing leg assignment of individual winding branches.

It is a characteristic feature of circuit arrangements according to feature B1 that two successive winding branches are excited in opposite directions in the starting stage with the highest effective machine impedance. Therefore they do not contribute to the resulting fundamental excitation but only increase the effective impedance. Since nine external terminals, are required for switching windings, additional switching stages are available by shorting these winding branches, as well as partial winding operation. Overall, the switching stages explained in Tables VII, VIII and IX for the circuits according to FIGS. 9, 10 and 11 can be achieved in this manner.

Winding Arrangements with Division

1. Subdivision Into Three Parallel Branches

The variations for dividing up windings described in previous embodiments with three parallel winding branches in the normal operating stage (FIGS. 2 to 4 and FIGS. 6 to 11) are shown in Table X. Whole slot windings are considered here which are generally used in squirrel cage induction motors, with q slots per pole. A leg then can be divided only into 2p/T winding branches, where 2p is the number of poles and T is an integral divisor of 2p. The three parallel branches must be structured differently if the number of pole pairs p is not divisable by three.

Table X shown below defines combinations dependent on the number of poles wherein the upper section of the table shows the number of coils per pole pair to be provided; the middle section shows the number of coil turns required if all coils are connected in series, respectively (the conductor cross section is to be provided reciprocally thereto); and the lower section shows another alternative, wherein the number of parallel paths to be provided within each winding leg if uniform winding coils are used throughout.

A subdivision into parallel branches with different configurations, i.e., different number and/or design of individual coils can also be provided in the normal operating stage in the two basic circuits according to FIGS. 1 and 5, with two parallel branches, as is indicated, for instance, in Table XI. Similarly, coils with different numbers of turns and wire cross sections or winding branches subdivided into corresponding parallel paths are then required in order to obtain the same effective number of turns per branch.

2. Physical Arrangement of the Winding Branches

There are many possible groupings for the spatial distribution of the individual winding branches as will be shown in the following by the concrete example of a 2p=4-pole three-phase winding for N=48 slots. For this example, the number of slots per pole and leg is $$q = \frac{N}{2p \cdot m} = \frac{48}{4 \cdot 3} = 4$$

Figure 14:
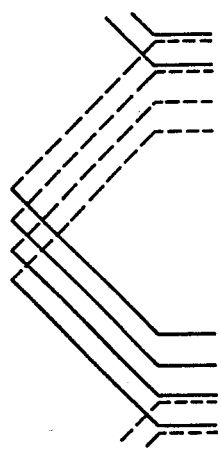
FIGS. 12, 13, 14 shows various other embodiments of the physical coil arrangement of the winding branches.
Figure 13:
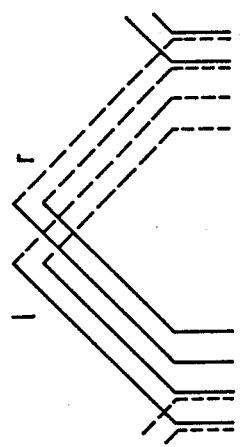
Figure 12:
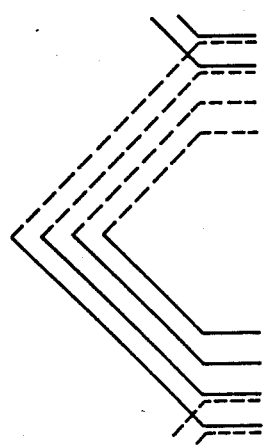

Coil arrangements which can be used for this purpose are: concentric coil groups, such as FIG. 12 with 1×4 coils each; partially concentric coil groups, such as FIG. 13 with 2×2 coils each; and coils of equal width such as FIG. 14 with 4×1 coils each.

The subdivision into two winding branches IW and IIW for a basic circuit according to FIG. 1 or FIG. 5 can be made according to the coil groupings listed in Table XII.

The smallest winding element of variants a and b is the coil group of a pole so that for this purpose, continuously wound concentric quadruple coil groups according to FIG. 12 or continuous 2×2 partially concentric coils according to FIG. 13 are available as the most practical winding design. These embodiments can also be realized with coils of equal width according to FIG. 14.

In the groupings c, d, e, double coils are the smallest winding elements as shown in FIG. 13 and 14.

In principle, a subdivision into two inner and two outer coils could be provided also with concentric quadruple coils as shown to FIG. 12. As is indicated in detail for the groupings c, d, there are two more variants each, depending on the sequence with which the left l and right R double coils are assigned to the two branches which differ from each other in spite of the very similar overall structure as far as the harmonic content is concerned.

Figure 15:
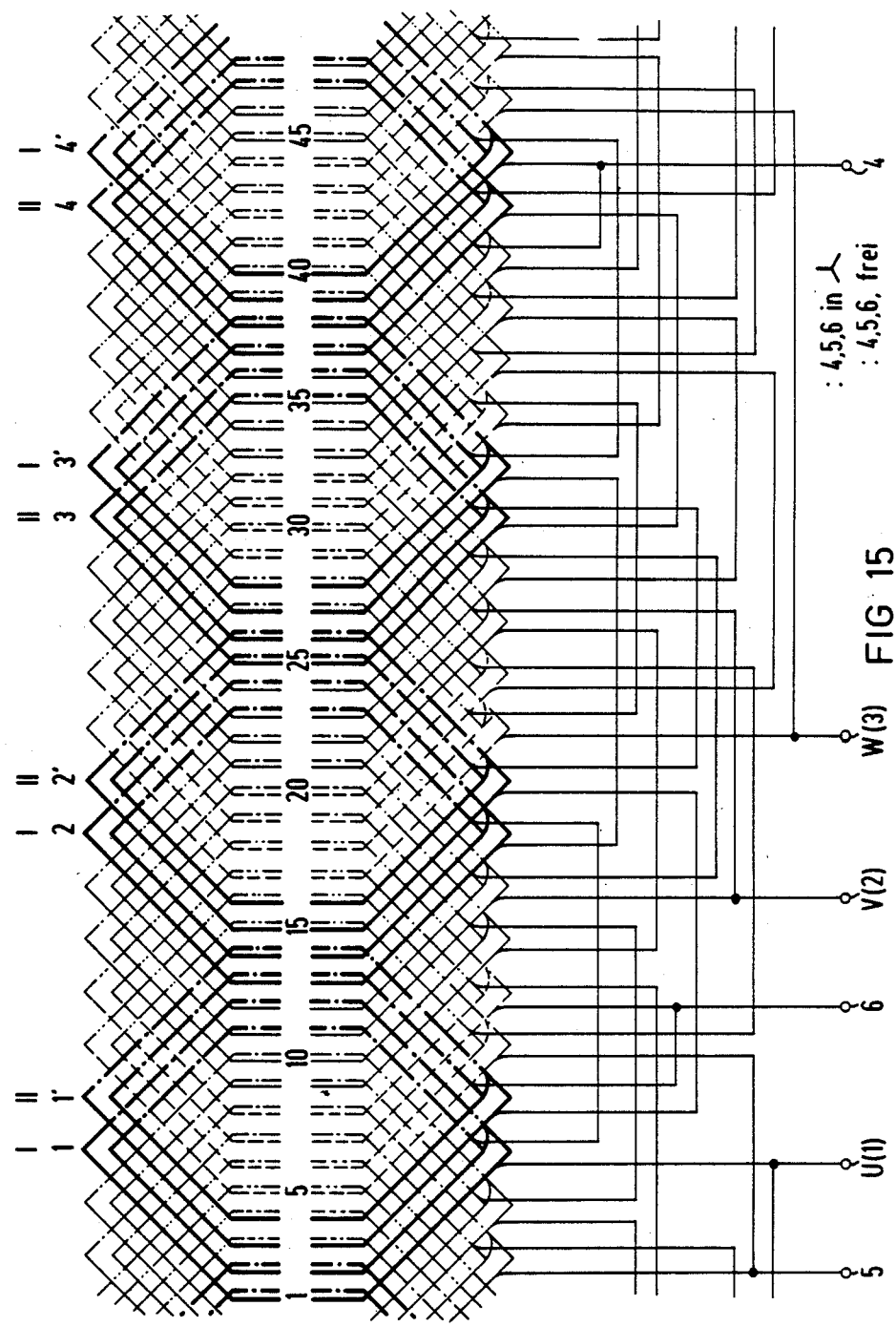
FIG. 15 shows a complete three phase winding in accordance with FIG. 1 with a winding branch grouping according to Table X.

A complete drawing of a three-phase winding according to grouping C2 of Table XII connected according to the basic circuit of FIG. 1 is shown in the FIG. 15.

There are additional grouping variants especially with the groupings f to m of Table XII. Individual coils are required here as the smallest winding element so that a coil arrangement according to FIG. 14 is most advantageous. Many variants are possible due to the fact that for the individual coil, for instance, under the second and third pole in grouping f, the degree of freedom always exists to select of the four coils per pole concerned as per FIG. 14, the first, second, third or fourth coil. This example should be sufficient to indicate the many possible variations. It must further be mentioned that the two winding branches IW and IIW can be structured differently from each other as shown by groupings l and m in Table XII.

Determination of the Winding Subdivision and Coil Grouping

The increase of the effective machine impedance during the acceleration the machine desired for reducing the inrush current is accomplished by the following two mechanisms:

1. By connecting normally parallel winding branches (i.e., branches parallel during the normal operation of the machine) in series. The values for the ohmic resistance $R_1$ and the stray reactance X per branch are increased thereby in the two basic circuits as per FIGS. 5 and 1 by a factor of 4 or 4/3, respectively, as compared to normal operation.

2. By considerably increased harmonic reactances, due to a multiplicity of additionally excited m.m.f. harmonics with uneven, even and also fractional order.

In determining the winding subdivision and coil grouping of the winding branches it is important to select an embodiment on the one hand provides the desired impedance increase but on the other hand, avoids disturbing harmonic fields as far as possible.

Figure 16:
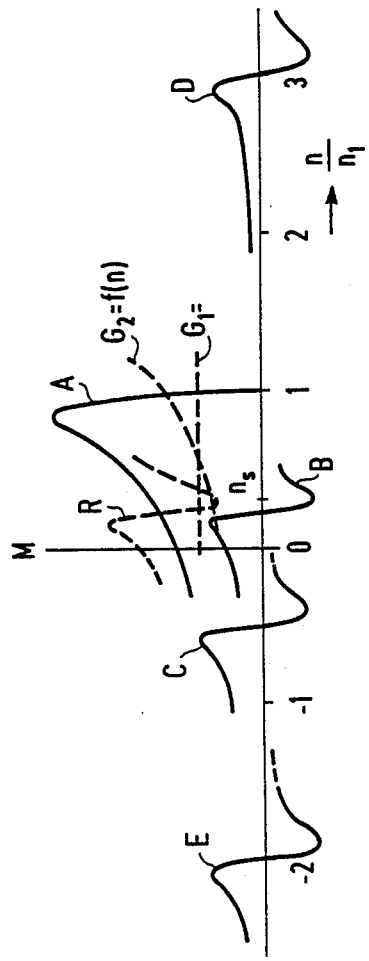
FIG. 16 shows fundamental-wave and harmonic torque/speed characteristics for a machine constructed in accordance with the invention.

Field harmonics which depress the torque/speed characteristic in the startup range, for instance, additional asynchronous harmonic torques of type B according to FIG. 16 are particularly undesirable. Together with the fundamental torque A, these harmonics produce a heavy depression in the resulting shape of the torque/speed characteristic R. If a given countertorque, for instance, countertorque $G_1$=constant or $G_2$=f (n) must be overcome during startup, the danger exists that the motor stalls at a crawling speed $n_s$. Particularly, corotating field harmonics, the synchronous speeds of which are in the startup range of the motor are also undesirable. A counter-rotating harmonic field of type C as well as corotating or counter-rotating fields of type D or E of "subharmonics" with a correspondingly high speed of rotating are hardly disturbing in this respect. Their asynchronous torque components have a braking or additional driving effect in the entire starting-up range.

Referring to the subdivision possibilities for the winding branches indicated in Tables XI and XII, the point is to select suitable embodiments where still further degrees of freedom consist in that the three winding branches.

(1) can be structured, beside a mutually similar arrangement, to be mutually offset by 120°, and also (2) in a manner different from each other.

While with (1) the field harmonics excited by every branch supplement each other in pairs alternating by with cortating and counter-rotating harmonic fields, also alternating fields occur with an asymmetric design according to (2) for the design of circuits according to the invention and of corresponding winding arrangements, there is thus a wide field of possible variations and matchings.

TABLE I
(for FIG. 2)

| | Connection to Terminal | Switching Connections | Notes |
|---|---|---|---|
| 1. Stage | 1, 2, 3 Delta Circuit | — | Additional Winding Branches Z carry no current; rest of winding in delta circuit |
| 2. Stage | 7, 8, 9 | — | Additional winding branches Z alone in operation |
| 3. Stage | 1, 2, 3 | 1–7, 2–8, 3–9 | Entire winding carries current, additional winding branches Z in Y circuit parallel to the rest of the winding in delta circuit |
| 4. Stage | 1, 2, 3 | 1–7, 2–8, 3–9, 4–5–6 | Normal operation triple Y circuit |

TABLE II
(for FIG. 6)

| | Connection to Terminal | Switching Connections | Notes |
|---|---|---|---|
| 1. Stage | 1, 2, 3 | — | Additional Winding Branches Z carry no current; rest of winding in delta circuit |
| 2. Stage | 7, 8, 9 | — | Additional winding branches Z alone in operation |
| 3. Stage | 1, 2, 3 | 1–7, 2–8, 3–9 | Entire winding carries current, one branch each of the additional winding Z is parallel to two series-connected branches of the rest of the winding |
| 4. Stage | 1, 2, 3 | 1–7–4, 2–5–8, 3–6–9 | Normal operation triple Y circuit |

TABLE III
(for FIG. 3)

| | Connection to Terminal | Switching Connections | Notes |
|---|---|---|---|
| 1. Stage | 7, 8, 9 | — | Additional Winding Branches Z connected directly to the network; winding train, closed in itself, of the rest of the winding serves as Y-point connection |
| 2. Stage | 1, 2, 3 | — | Additional winding branches Z carry no current; rest of the winding in delta circuit |
| 3. Stage | 1, 2, 3 | 1–7, 2–8, 3–9 | Additional winding branches Z as a parallel path to one branch each (half of leg) of the delta-connected rest of the winding |
| 4. Stage | 1, 2, 3 | 4–5–6 | Additional Winding Branches Z carry no current; rest of the winding in double-Y circuit |
| 5. Stage | 1, 2, 3 | 1–7, 2–8, 3–9, 4–5–6 | Normal operation; triple Y-circuit |

TABLE IV
(for FIG. 7)

| | Connection to Terminal | Switching Connections | Notes |
|---|---|---|---|
| 1. Stage | 7, 8, 9 | — | Additional Winding Branches Z with opposed direction in series with rest of winding in delta circuit |
| 2. Stage | 1, 2, 3 | — | Additional winding current; rest of winding in delta circuit |
| 3. Stage | 1, 2, 3 | 1–7, 2–8, 3–9 | Additional winding branches Z as a parallel path to one branch each (half of a leg) of the delta-connected rest of the winding |
| 4. Stage | 1, 2, 3 | 1–4–7, 2–5–8, 3–6–9 | Additional Winding branches Z carry no current; rest of the winding in double-delta circuit |
| 5. Stage | 1, 2, 3 | 1–4–7, 2–5–8, 3–6–9 | Normal operation; triple delta-circuit |

TABLE V
(for FIG. 4)

| | Connection to Terminal | Switching Connections | Notes |
|---|---|---|---|
| 1. Stage | 4, 5, 6 | — | Additional Winding Branches Z directly connected to network; winding train closed in itself serves as the Y-point connection |
| 2. Stage | 1 2, 3 | — | Additional winding branches Z carry no current; rest of the winding in delta circuit |
| 3. Stage | 4, 5, 6 | 7–8–9 | Only additional winding |

TABLE V-continued
(for FIG. 4)

| | Connection to Terminal | Switching Connections | Notes |
|---|---|---|---|
| | | | branches Z are active in Y circuit |
| 4. Stage | 1, 2, 3 | 7-8-9 | Additional winding current; rest of the winding in double-Y circuit |
| 5. Stage | 1, 2, 3 | 1-7, 2-5, 3-6 | Normal operation; triple-Y circuit with three separated Y-points |

TABLE VI
(for FIG. 8)

| | Connection to Terminal | Switching Connections | Notes |
|---|---|---|---|
| 1. Stage | 1, 2, 3 | 1-4 | Partial winding operation with only three winding branches in delta circuit |
| 2. Stage | 1, 3, 5 | 1-7 | Partial winding operation with six winding branches in delta circuit |
| 3. Stage | 1, 3, 5 | 1-7, 3-9, 5-8 | Parallel operation of one delta circuit each with three and six winding branches |
| 4. Stage | 1, 2, 3 | 1-4-7, 2-8, 3-9 | Partial winding operation with six winding branches in double-delta circuit |
| 5. Stage | 1, 3, 5 | 1-4-7, 2-5-8, 3-6-9 | Normal operation; triple-delta circuit |

TABLE VII
(for FIG. 9)

| | Connection to Terminal | Switching Connections | Notes |
|---|---|---|---|
| 1. Stage | 1, 2, 3 | — | All winding branches carry current; always two with opposite direction of excitation |
| 2. Stage (a) | 4, 5, 6 | — | Partial winding operation; six branches without current |
| or (b) | 1, 2, 3 | 1-4, 2-5, 3-6 | Partial winding operation; six branches without current |
| or (c) | 1, 2, 3 | 7-8-9 | Partial winding operation; six branches without current |

TABLE VII-continued
(for FIG. 9)

| | Connection to Terminal | Switching Connections | Notes |
|---|---|---|---|
| 3. Stage | 4, 5, 6 | 7-8-9 | Partial winding operation; three branches without current |
| 4. Stage | 1, 2, 3 | 1-4, 2-5, 3-6 and 7-8-9 | Normal operation; triple-Y circuit |

TABLE VIII
(for FIG. 10)

| | Connection to Terminal | Switching Connections | Notes |
|---|---|---|---|
| 1. Stage | 1, 2, 3 | — | Y circuit; three branches in series per leg, of which two are in opposite directions; all coils carry current |
| 2. Stage | 4, 5, 6 | — | Partial winding operation; Y-circuit only three branches carry current |
| 3. Stage | 4, 5, 6 | 7-8-9 | Partial winding operation; double Y-circuit; three branches remain without current |
| 4. Stage | 1, 2, 3 | 1-4, 2-5, 3-6 | All coils carry current; parallel circuit of three branches in Y-circuit and six branches in delta circuit |
| 5. Stage | 1, 2, 3 | 1-4, 2-5, 3-6, 7-8-9 | Triple Y circuit for normal operation |

TABLE IX
(for FIG. 11)

| | Connection to Terminal | Switching Connections | Notes |
|---|---|---|---|
| 1. Stage | 1, 2, 3 | — | All winding branches carry current; always two with opposed direction of excitation |
| 2. Stage | 1, 2, 3 | 1-7, 2-8, 3-9 | Partial winding operation; six branches are without current |
| 3. Stage | 1, 2, 3 | 1-4, 2-5, 3-6 | All winding branches carry current; for each leg, parallel circuit of one each winding branch of the own leg with two series-connected branches of adjacent legs |
| 4. Stage | 1, 2, 3 | 1-7-4, 2-5-8, 3-6-9 | Normal operation; triple delta circuit |

TABLE X
Subdivision Into Three Parallel Winding Branches

| | | Number of Poles | | | | | | |
|---|---|---|---|---|---|---|---|---|
| | | 4 | 6 | 8 | 10 | 12 | 14 | 16 Etc. |
| No. of poles per parallel branch | Branch 1 | q | 2 q | 2 q | 3 q | 4 q | 4 q | 5 q |
| | Branch 2 | q | 2 q | 3 q | 3 q | 4 q | 5 q | 5 q |
| | Branch 3 | 2 q | 2 q | 3 q | 4 q | 4 q | 5 q | 6 q |
| 1. First embodiment, all coils in series | Number of turns per coil | | | | | | | |
| | $w_1$ | 1 | 1 | 1 | 1 | 1 | 1 | 1 |
| | $w_2$ | 1 | 1 | ¾ | 1 | 1 | 4/5 | 1 |
| | $w_3$ | ½ | 1 | ¾ | ¾ | 1 | 4/5 | 5/6 |
| 2. Second embodiment, uniform coil windings | Required parallel paths | | | | | | | |
| | $a_1$ | 1 | 1 | 2 | 3 | 1 | 4 | 5 |

TABLE X-continued

Subdivision Into Three Parallel Winding Branches

| | | Number of Poles | | | | | | |
|---|---|---|---|---|---|---|---|---|
| | | 4 | 6 | 8 | 10 | 12 | 14 | 16 | Etc. |
| throughout | | | | | | | | |
| | $a_2$ | 1 | 1 | 3 | 3 | 1 | 5 | 5 |
| | $a_3$ | 2 | 1 | 3 | 4 | 1 | 5 | 6 |

TABLE XI

Subdivision Into Two Different Parallel Branches

| | Number of Poles | | | | | |
|---|---|---|---|---|---|---|
| | 4 | 6 | 8 | 10 | 12 | 14 | etc. |
| With Equal Subdivision | 2 q + 2 q | 3 q + 3 q | 4 q + 4 q | 5 q + 5 q | 6 q + 6 q | 7 q + 7 q | |
| With Different Subdivision | q + 3 q | 2 q + 4 q | 3 q + 5 q | 4 q + 6 q | 5 q + 7 q | 6 q + 8 q | |
| | | | 2 q + 6 q | 3 q + 7 q | 4 q + 8 q | 5 q + 9 q | |
| | | | | 2 q + 8 q | 3 q + 9 q | 4 q + 10 q | |
| | | | | | 2 q + 10 q | 3 q + 11 q | |

TABLE XII

Systematic Overview of the Different Subdivision Variation for 2p = 4 with 2 = 4 coils per pole per leg.
Coil Assignment to the [Illegible]

| Grouping | | winding branch | 1.pol. | 2.pol. | 3.pol. | 4.pol. | |
|---|---|---|---|---|---|---|---|
| (a) | | IW | 4 | — | 4 | — | FIG. 12, 13, 14 |
| | | IIW | — | 4 | — | 4 | |
| (b) | | IW | 4 | 4 | — | — | |
| | | IIW | — | — | 4 | 4 | |
| (c) | (1) | IW | 2 — | — 2 | 2 — | — 2 | FIG. 13, 14 |
| | | IIW | — 2 | 2 — | — 2 | 2 — | |
| | (2) | IW | 2 — | 2 — | — 2 | — 2 | |
| | | IIW | — 2 | — 2 | 2 — | 2 — | |
| (d) | (1) | IW | 2 — | 4 | — 2 | — | |
| | | IIW | — 2 | — | 2 — | 4 | |
| | (2) | IW | — 2 | 4 | 2 — | — | |
| | | IIW | 2 — | — | — 2 | 4 | |
| (e) | | IW | 4 | — | — 2 | 2 — | |
| | | IIW | — | 4 | 2 — | — 2 | |
| (f) | | IW | 4 | 3 | 1 | — | |
| | | IIW | — | 1 | 3 | 4 | |
| (g) | | IW | 4 | 1 | 3 | — | |
| | | IIW | — | 3 | 1 | 4 | |
| (h) | | IW | 3 | 2 | 1 | 2 | |
| | | IIW | 1 | 2 | 3 | 2 | |
| (i) | | IW | 3 | 2 | 2 | 1 | FIG. 14 |
| | | IIW | 1 | 2 | 2 | 3 | |
| (j) | | IW | 3 | 3 | 1 | 1 | |
| | | IIW | 1 | 1 | 3 | 3 | |
| (k) | | IW | 3 | 1 | 3 | 1 | |
| | | IIW | 1 | 3 | 1 | 3 | |
| (l) | | IW | 3 | 2 | 3 | — | |
| | | IIW | 1 | 2 | 1 | 4 | |
| (m) | | IW | 3 | 2 | — | 3 | |
| | | IIW | 1 | 2 | 4 | 1 | |

We claim:

1. A circuit and winding arrangement for starting up a three-phase rotating-field machine, especially an induction motor having a squirrel cage winding and a stator winding, wherein the stator winding of the machine is subdivided for each phase into three winding branches and is switchable to at least three different operating stages for increasing the impedance of the machine during the starting up process, the first and second winding branches of each phase being joined permanently into a self-contained winding train, whereby six connection points are formed by common connection points of two respective winding branches, and wherein three selected connection points of the first and second winding branches are connected in delta formation during an operating starting up stage and three further connection points during a further starting up stage are connected in a double delta formation, and wherein during a normal operating stage the third winding branches are connected in delta formation.

2. The circuit and winding arrangement recited in claim 1, wherein the third winding branches are permanently connected in delta formation.

3. The circuit and winding arrangement recited in claim 1, wherein the third winding branches are connected by one of their winding ends to the three further connection points of the self-contained winding train.

4. The circuit and winding arrangement recited in claim 3, wherein another winding end of the third winding branches is brought out as a separate connection.

5. The circuit and winding arrangement recited in claim 1, wherein the three winding branches of each phase are switched in parallel during the normal operating stage and have a different number of coils which are arranged differently distributed in space, said coils having a different winding number and different conductor cross sections.

6. A circuit and winding arrangement for starting up a three-phase rotating-field machine, especially an induction motor having a squirrel cage winding and a stator winding, the stator winding of the machine being subdivided into three winding branches, wherein, for increasing the impedance of the machine during the starting up process, the machine is switchable to at least three different operating stages, all winding branches of the individual phases being joined permanently to a self-contained winding train, whereby altogether nine connecting points are formed by the connecting places of two respective winding branches, and wherein by connection of three selected connecting points of the winding train and bridging over of one of the connecting points with a selected connecting point of the remaining connecting points, the first and the second winding branches are delta connected during a start-up operating stage, and wherein by corresponding further bridging over of the three connecting points by three further connecting points of the remaining connecting points, the first and second winding branches are double-delta connected during a further start-up stage, and during a normal operating stage the third winding branches are delta connected.

7. The circuit and winding arrangement recited in claim 6, wherein the three winding branches of each phase are switched in parallel during the normal operating stage and have a different number of coils which are arranged differently distributed in space, said coils having a different winding number and different conductor cross sections.

8. A circuit and winding arrangement for starting up a three-phase rotating field machine, especially an induction motor having a squirrel cage winding and a stator winding, the stator winding of the machine being subdivided into three winding branches for each phase, wherein, for increasing the impedance of the machine during the starting up process, the machine is switchable to at least three different operating stages, the first and second winding branches for each phase being joined permanently to a self-contained winding train, whereby connecting points of two winding branches associated with the same respective phase during a normal operating stage are provided as external connections and further connecting points between the winding branches associated with different phases during a normal operating stage are Y-switchable and wherein the third winding branches are connected and provided at another winding end, whereby during the normal operating stage a triple Y circuit is formed.

9. The circuit and winding arrangement recited in claim 8, wherein the three winding branches of each phase are switched in parallel during the normal operating stage and have a different number of coils which are arranged differently distributed in space, said coils having a different winding number and different conductor cross sections.

10. The circuit and winding arrangement recited in claim 8, wherein the third winding branch associated with a selected phase during the normal operating stage is connected with a further connecting point of the winding branches associated with the two other phases during the normal operating stage, whereby in internal Y-points not provided as network connections with only six connections three operating stages are possible.

11. A circuit and winding arrangement for starting up a three-phase rotating field machine, especially an induction motor having a squirrel cage winding and a stator winding, the stator winding of the machine being subdivided into three winding branches per phase, wherein, for increasing the impedance of the machine during the starting up process, the machine is switchable to at least three different operating stages, wherein three respective winding branches of alternating current-flow direction are delta connected in series and connecting points between the individual winding branches are provided as connections, whereby during a start-up stage the complete series connection of the winding branches is switched on and during a further start-up stage, the winding branches wherein current-flow is in opposing directions during the one starting up stage are bridged over, and during the normal operating stage all winding branches are switched in triple delta formation.

12. The circuit and winding arrangement recited in claim 11, wherein the three winding branches of each phase are switched in parallel during the normal operating stage and have a different number of coils which are arranged differently distributed in space, said coils having a different winding number and different conductor cross sections.

* * * * *